United States Patent
Krause et al.

[15] 3,687,151
[45] Aug. 29, 1972

[54] SIGNAL CONVERTER AND AMPLIFIER FOR METERING ADDITIVE FLOW

[72] Inventors: Ronald O. Krause, Waukesha, Wis.; Kenneth J. Ayala, Winter Park, Fla.

[73] Assignee: Nutrico, Inc., Milwaukee, Wis.

[22] Filed: Feb. 26, 1971

[21] Appl. No.: 119,086

[52] U.S. Cl. ............................................ 137/101.21
[51] Int. Cl. ............................................. F16k 19/00
[58] Field of Search ............. 137/101.19, 101.21, 114

[56] References Cited

UNITED STATES PATENTS 3,038,486   6/1962   Thurman .......... 137/101.21 X

*Primary Examiner*—Robert G. Nilson
*Attorney*—Andrus, Sceales, Starke & Sawall

[57] ABSTRACT

An additive liquid is metered to a flowing liquid through an adjustable linear valve. A turbine meter provides a pulse train proportional to flow in the main line. A servo system includes a servomotor positioning the valve and a differential amplifier circuit to control the motor. The amplifier circuit includes a first channel connected to the turbine meter to convert the pulse train to a related D.C. analog signal which is connected across a ratio selection potentiometer. The amplifier circuit includes a second channel connected to the feedback potentiometer which is energized from a properly scaled D.C. source through a pressure compensating variable resistor to compensate for different main line pressures. A differential summing amplifier is connected to sum the two signals and establish a corresponding polarity signal for energizing a polarity sensitive relay which connects the servomotor to properly position the valve.

9 Claims, 2 Drawing Figures

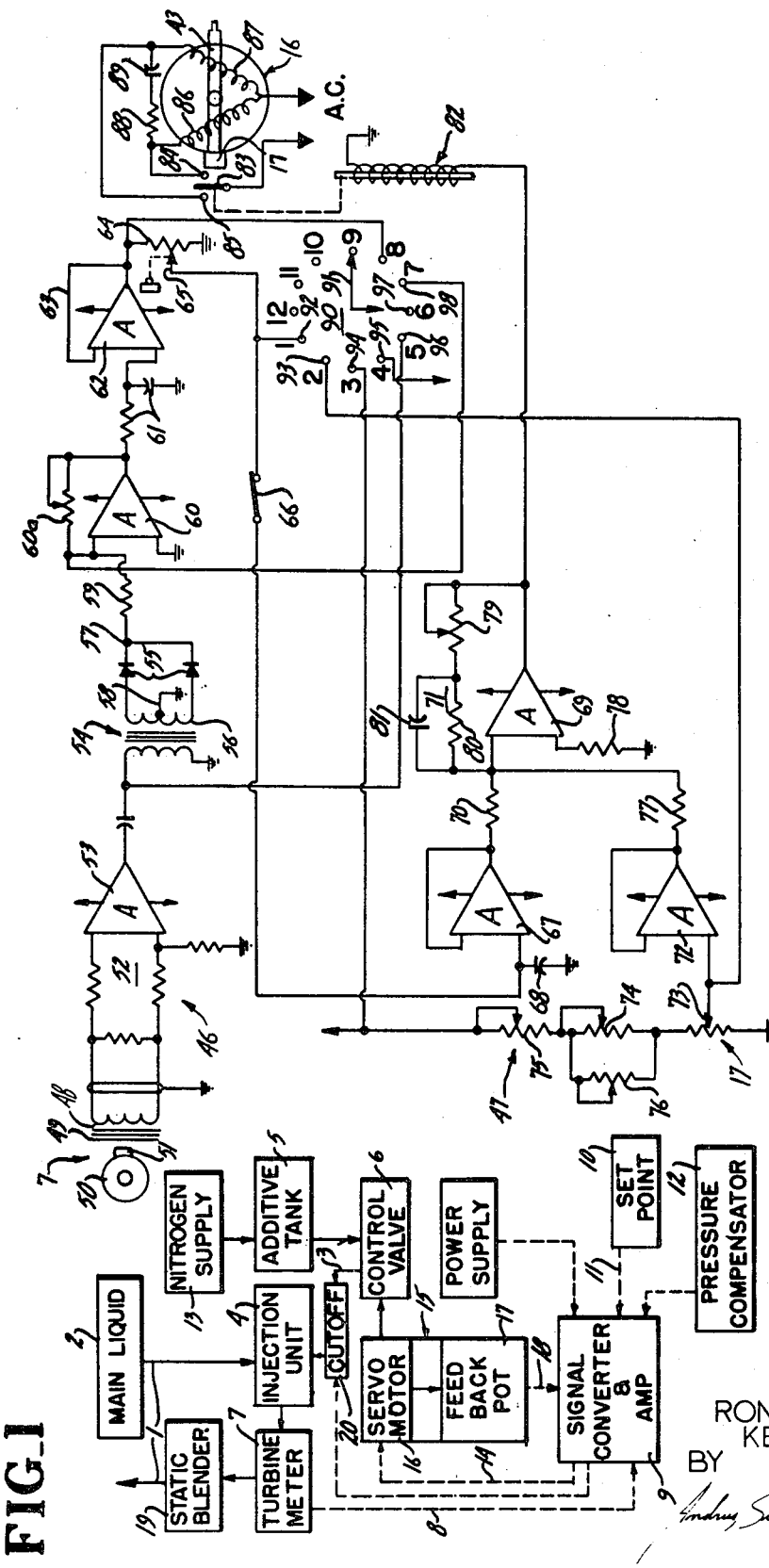

SIGNAL CONVERTER AND AMPLIFIER FOR METERING ADDITIVE FLOW

BACKGROUND OF THE INVENTION

This invention relates to a control circuit for modulation of the amount of material added to a liquid flow and, in particular, in accordance with the liquid flow rate.

In various processes, a small amount of a second material is desirably added to and blended with a relatively large and rapidly flowing liquid stream. For example, in the processing of various liquid foods such as fruit juices, beer, soft drinks and the like, liquid sterilizing agents have recently been suggested as a substitute for the more traditional heat-sterilization of the liquid during the processing. A particularly satisfactory system and apparatus is shown in U.S. Pat. No. 3,506,460 to Peter D. Bayne. As more fully disclosed therein, a small amount of a sparingly soluble sterilizing agent is introduced and blended with the flow stream of the liquid perishable material prior to the packaging thereof. An injector unit is mounted in the main stream flow line and is interconnected through a valved line to a storage unit. In this manner, small amounts of the sterilizing agent are introduced into the flowing liquid. An in-line blender is preferably provided immediately following the injector unit to agitate the liquid and the sterilizing agent and insure full dissolving of the sterilizing agent in the liquid. In order to provide accurate control of the amount of the sterilizing agent, a flow sensing means is connected in the main flow line and produces a signal which is coupled through a suitable converter to control the setting of a flow valve in the sterilizing agent flow line. The valve is shown as a motor-operated variety or the like which opens and closes in accordance with the flow rate to maintain a predetermined flow.

Applicants have found that the flow rate may vary substantially and rapidly and that the apparatus presently employed in additive controls does not produce a highly accurate proportion of additive material to the liquid flow, particularly at extremely low ratios. Thus, as noted in the above Bayne patent, in the sterilization of liquid food products and the like, extremely low ratios of additive to base liquid flow are employed. Typically, the sterilizing agent added to the perishable material is in the range of 0.000122 grams per liter. Although pumping and batch loading have also been suggested, they are not sufficiently accurate where parts per million type injection rates on a continuing basis are required such as in the application for sterilization of food products.

An unusually satisfactory monitoring system is disclosed in the application of R. O. Krause, entitled "Continuous Control For Introducing Material Into A Flowing Liquid" which was filed on Feb. 26, 1971 with Ser. No. 119,087 and which is assigned to a common assignee with this application. Generally, a flow-sensing turbine meter is connected in the main flow line and establishes a related train of pulse signals which are fed to a suitable signal comparator and amplifying circuit means to establish an operating control signal. The error signal is connected to a servomotor which, in turn, is connected to position a control valve and simultaneously to position a related feedback signal generator which produces a signal related to the valve position. The control valve, in turn, is selected as a linear positioning valve whereby each unit change in the position of the valve establishes a corresponding change in flow such that the position of the valve accurately determines the amount of flow. The output of the generator is connected into the amplifying means and summated with the flow related signal and a set point signal established by a set point signal unit. The latter signal unit establishes a signal corresponding to that of the flow sensing means and the feedback generator when the desired ratio of the additive to the liquid flow is present. The circuit thus compares the three signals consisting of the set point signal, the flow-related signal and the feedback signal to produce a closed loop drive of the valve servomotor with a corresponding accurate positioning of the control valve.

SUMMARY OF THE INVENTION

The present invention is particularly directed to a reliable and practical electrical servo control circuit including a differential amplifying circuit providing a rapid response for precise metering of the preselected relatively minute portions of the additive material to a flowing liquid on a continuous basis.

A flow meter is connected in the flow line and establishes a flow related signal such as the train of pulses from a turbine meter, in accordance with the liquid flow. In accordance with the present invention, the signal is applied to the servo control circuit and particularly to one of a pair of signal channels for connecting the several electrical control signals to the input means of a differential amplifier. A set point signal means establishes an appropriately scaled set point signal related to desired proportion of additive material to the flowing liquid. A pressure compensating signal means produces a correspondingly scaled signal which compensates for the back pressure of the process flow line and which will affect the interrelationship between the set point signal and the flow-related signal. In one aspect of the invention, the flow-related analog is connected to energize a preset selection potentiometer having an output tap connected to the input of the differential amplifier. The output of the differential amplifier is thus an analog signal related to the comparison of the set point setting of the potentiometer and the flow-related signal. This is connected to and drives the servomotor to correspondingly position the control valve and a linear precision feedback signal means such as a potentiometer. The feedback signal is a related analog signal which is fed back to one of the channels to appropriately modify the signal and to maintain accurate drive and position of the servomotor until the flow-related signal as modified by the set point setting just balances the feedback signal. Applicants have found that this circuit provides a rapid and accurate response required to produce optimum metering of the relatively small amounts of an additive to continuous flowing liquid.

In a preferred and novel construction of the present invention, the two channels to the differential amplifier include a first channel connected to the output of the turbine meter. This first channel includes a digital to analog converter to establish an alternating current signal proportional to the pulse rate of the output of the turbine meter. A detecting and rectifying means is coupled to the converter and establishes a corresponding direct current analog signal. The analog signal is further amplified and connected across a selection potentiometer having a tap to permit selection of a portion of the flow-related signal. The potentiometer tap is manually set to the desired additive rate and is coupled through an amplifier to a linear summing resistor connected to the input of a summing amplifier. The second signal channel includes a feedback potentiometer having a tap coupled to and driven by the valve positioning servomotor. The tap of the feedback potentiometer is also coupled by an amplifier to a linear summing resistor to the same input of the summing amplifier. The output of the summing amplifier is a polarity related-signal corresponding to whichever signal is greatest. This signal is applied to a polarity sensitive relay having forward drive contacts and reverse drive contacts. The servomotor is a precision reversible motor having a forward drive circuit and a reverse drive circuit means. The forward drive circuit means is connected to power through the forward drive contacts of the polarity sensitivity relay and the reverse drive circuit means is similarly connected to power by the drive contacts of the relay. The servo motor is thereby driven to position the valve and the interconnected potentiometer to establish a null output from the summing amplifier.

The summing amplifier is preferably provided with a feedback network including a variable resistance means to permit adjustment of the circuit sensitivity and a stabilizing capacitive response network.

The present invention provides a high satisfactory control circuit which establishes a sensitive and rapid response for positioning of the linear metering valve and thus is particularly adapted for monitoring the addition of relatively minute quantities of an additive to a flowing liquid of a perishable material in a continuous manner and in response to rapidly varying rates of flow.

BRIEF DESCRIPTION OF THE DRAWING

The drawing furnished herewith illustrates the best mode presently contemplated for carrying out the subject invention and clearly discloses the above advantages and features as well as others which will be readily understood from the following description.

In the drawing:

FIG. 1 is a block flow and control diagram showing the invention applied to the addition of a liquid sterlizing agent to a main flowing liquid product; and FIG. 2 is a schematic circuit diagram of the signal converter and amplifier circuit shown in FIG. 1 constructed in accordance with the teaching of the present invention.

DESCRIPTION OF THE ILLUSTRATED EMBODIMENT

Referring to the drawings and particularly to FIG. 1, a main liquid flow line 1 is shown for carrying a perishable liquid such as beer, fruit juice, soft drinks, wine or the like from a source 2 to any suitable further processing means, not shown. A sterilizing agent additive line 3 is connected to the line 1 through an injection unit 4 to supply small amounts of a liquid sterilizing agent from a pressurized additive source 5 to the liquid flowing through line 1. A control valve 6 controls the amount of liquid additive supplied to unit 4. The liquid sterilizing agent may, for example, be a diethyl pyrocarbonate or mixed anhydrides or the like which when dissolved in the perishable liquid, eliminates the necessity for the usual subsequent heat sterilization. Generally, in accordance with the present invention, a flow meter 7 is connected to the line 1 immediately downstream of the injector unit 4 and establishes an electrical output signal which is applied via a line 8 to a signal converting and amplifying circuit 9. A set point signal generator 10 establishes an electrical signal scaled to the signal output of the meter and is connected to a second input line 11 to the circuit 9.

A pressure compensator 12 is also connected to the signal converter and amplifier 9 to compensate for the pressure in the main flow system and particularly line 1.

The sterilizing agent within the source or tank 5 is maintained under a predetermined constant pressure, such as from a fluid pressure supply means 13. The valve 6 is a linear valve unit such that the flow of the sterilizing agent through the additive line 3 is precisely related to the constant pressure, the sized opening of the valve 6, and the back pressure of line 1.

The preset and flow related signals are compared and generate a difference signal at an output line 14 which, in turn, is interconnected to drive a servomotor assembly 15 for positioning of valve 6. Generally, assembly 15 includes a servomotor 16 coupled to control the position of the additive valve 6 and also coupled to correspondingly position a feedback potentiometer 17. The control valve 6 is a suitable linear-type valve such as a spring-loaded variable orifice valve which will permit accurate metering in accordance with the opening of the valve, generally as more fully disclosed in the copending application of R. O. Krause entitled "Continuous Control For Introducing Material Into A Flowing Liquid" which was filed on the same day as this application and is assigned to the same assignee. The motor 16 thus opens and closes the valve 6 to vary the additive flow from the source 5 to the injector unit 4 to thereby adjust the quantity or amount of the sterilizing agent fed to the main line 1.

The motor 16 simultaneously positions the feedback potentiometer 17 to establish an analog signal directly related to the opening of the valve 6 as determined by the position of the servomotor 16. The potentiometer output signal is also connected via a line 18 to the converter and amplifying circuit 9 and summated with the difference signal to establish an error signal equal to the difference between the sensed error and the error in the setting of the valve 6 and thereby create precise movement of the servomotor 16 and a corresponding positioning of the control valve 6 until the error signal is effectively zero.

A suitable blender 19 is connected in the main flow line 1 and is preferably a suitable static blender to fully mix the additive and the main liquid.

A cutoff valve 20 is shown inserted in the additive flow line 3 between the control valve 6 and the injection unit 4. The valve 20 may be a solenoid-actuated valve or the like interconnected to the signal converter and amplifying circuit 9. If the output of the meter 7 drops to indicate a predetermined minimum flow rate in the main flow line 1, the valve 3 is actuated to close the additive flow line and terminate the flow therethrough.

Thus, in the operation of the illustrated system, the operator sets the set point generator 10 and the pressure compensator 12 in accordance with the particular characteristics of the flow line and the desired additive rate. The modified preset signal is compared to the output of the turbine meter 7 and provides a drive for the opening of the linear control valve 6 in accordance with the preset amount. In addition, an inner control loop is provided by the feedback potentiometer 17 to insure accurate positioning of the servomotor in accordance with the error signal. The linear control valve 6 provides a very precise metering while the feedback system is based on the valve position rather than any special sensing of the actual additive flor rate. This is particularly desirable and provides a more accurate control than was obtained by determination of the small amount of flow of the additive material. If the main liquid flow should drop below a predetermined level, the output actuates the cutoff valve 20 to terminate the additive flow.

As more fully disclosed in the previously referred to Bayne Pat. No. 3,506,460, the sterilizing agent tank 5 is preferably maintained at a pressure of at least five pounds per square inch and preferably in the range of 25 to 35 pounds per square inch above the pressure of the beverage in line 1. The storage tank 5 is preferably pressurized by an inert gas such as nitrogen which is introduced into the storage tank or the head space of the tank from a suitable pressure source which is preferably a regulated pressure source to maintain the desired pressure conditions in the storage tank and therefore on the additive in the flow line.

A highly satisfactory pin type control valve 6 which has been employed is a micro-metering valve 22RS4 sold by Whitey Research Tool Co. of Emeryville, Cal., as shown in the previously identified copending application, entitled "Signal Converter and Amplifier for Metering Additive Flow".

Referring particularly to FIG. 2, the signal converter and amplifying circuit 9 is constructed in accordance with the teaching of the present invention and includes a pickup channel 46 for converting the output of the turbine meter 7 into a related analog signal, which is connected to energize the set point generator 10 and applied to one side of a comparator channel 47. The opposite side of the comparator channel 47 is connected to the feedback potentiometer 17 which is connected in circuit with a suitable pressure and calibration adjustment means.

More particularly, as shown in FIG. 2, the turbine meter 7 includes a pickup coil 48 associated with a magnet core 49. The rotor 50 of the turbine meter 7 includes a rotating magnetic control device 51 such that the rotation of the unit generates one or more pulse signals in the coil 48 for each revolution. Thus, the output of the turbine meter 7 appears at the coil 48 as a series of time-spaced induced voltage signals related directly to the rotational rate of the turbine meter rotor, which, in turn, is directly related to the volumetric flow. The output of the coil 48 is connected through a resistive coupling network 52 to the input of an amplifier 53 having its output capacitive coupled to the primary of a detector transformer 54. A pair of diode rectifiers 55 are connected to the opposite ends of the secondary winding 56 of transformer 54 and are similarly polarized with respect to a common output terminal 57 to establish a fullwave rectified voltage with respect to a grounded center tap connection 58. The fullwave output provides a related direct current signal connected through a coupling resistor 59 to the inverting input of an operational amplifier 60. A stabilizing feedback potentiometer 60a interconnects the output of the amplifier 60 to the input to establish an operational amplifying network, the output of which is a direct current signal proportional to the flow rate. A resistor and a bypass filtering capacitor 61 to ground connects the output to the non-inverting input of a second operational amplifier 62, the other input being interconnected through a feedback line 63 to the output. The resistor-capacitor 61 will filter spurious transient signals and the like from the output stage and thus result in driving of the amplifier 62 in accordance with the converted analog flow-related signal.

The output signal is applied across a proportioning potentiometer 64 connected between the output of the amplifier and ground. The potentiometer 64 includes a tap 65, connected as an input to channel 47 through a manually operated test switch 66. The setting of the potentiometer 64 determined the proportion of the flow-related voltage employed as an input to actuate the servo system and thereby permits adjustment of the amount of additive for any given flow in accordance with a desired range. Generally, the potentiometer 64 is a precision linear potentiometer which may be calibrated in parts per million to permit direct setting of the additive in parts per million for any given flow rate.

The output tap 65 of the potentiometer is coupled at one input to the non-inverting input of an operational amplifier 67 of channel 47 with a further stabilizing capacitor 68 connecting the potentiometer tape 65 to ground. The output of the amplifier 67 is connected on one input of a servo-drive amplifier 69 by a precision resistor 70, the output of which is connected to control the energization of the servomotor 16 as presently described.

Amplifier 69 is an operation amplifier having a suitable resistor-capacitor feedback network 71 connected to the inverting input of amplifier 69.

A feedback amplifier 72 similar to the flow-related signal amplifier 67 has a corresponding non-inverting input connected to the tap 73 of the servo-driven potentiometer 17. Tap 73 is coupled to and positioned by the servomotor 16 to establish a signal proportional to the opening of valve 6. The one side of the potentiometer 17 is grounded and the opposite side is connected in series with a pressure adjustment potentiometer 74 and a calibrating potentiometer 75 to the positive side of a D.C. power supply. A span adjustment potentiometer 76 is shown connected in parallel with the pressure adjusting potentiometer 74.

In the operation of the circuit, the input to the feedback servo-position related amplifier 72 establishes an output in accordance with the position of the servomotor 16 and therefore the additive control valve 6. The output of the amplifier 72 is coupled through a precision resistor 77 to the summing input of the servo-drive amplifier 69 in common with the output of the flow-related drive amplifier 67. The opposite input of the amplifier 69 is grounded through a precision resistor 78. The operational amplifier includes the feedback network 71 which has a potentiometer 79 in series with a fixed resistor 80 interconnecting the output of the amplifier to the summing input. A small filtering and shaping capacitor 81 is connected in parallel with the fixed resistor 80. The output of the amplifier 69 is a polarity-related D.C. signal directly proportional to the algebraic summation of the output of the feedback amplifier 72 and the flow-related amplifier 67. The output of the amplifier 69 is connected to energize a polarity sensitive relay 82.

The relay 82 is shown schematically as a single pole, double-throw unit having a common pole 83 connected to one side of an alternating current power supply and selectively engaging a forward drive contact 84 and reverse drive contact 85. The contacts 84 and 85 are connected to selective energize the servomotor 16, the opposite side of which is connected to the opposite side of the alternating current power supply.

The servomotor 16 is shown as a conventional servomotor having a pair of windings 86 and 87 connected in common at one end to the alternating current power supply line. The opposite ends of the windings 86 and 87 are connected directly to the forward drive contact 84 and the reverse drive contact 85 respectively. A resistor 88 in series with a capacitor 89 is connected across the contact connection to the two windings 86 and 87. Thus, with the relay common pole 83 connected to the forward drive contact 84, the forward drive winding 86 is connected directly across the A.C. power line while the winding 87 is connected across such lines in series with the resistor 88 and capacitor 89. Conversely, when the common pole 83 is connected with the reverse drive contact 85, the reverse driving winding 87 is connected directly across the power lines and the opposite winding 86 is connected across the power lines in series with the resistor 88 and the capacitor 89. This provides for the opposite rotation of the servomotor and a corresponding rotation positioning of the valve shaft 43 and the tap of potentiometer 17, as diagrammatically shown by the opposite extension of the motor shaft.

In the illustrated embodiment of the invention, the several components of the circuit may be tested through the opening of the test switch 66 and the selective connection of a D.C. power test supply directly into the circuit at appropriate points through a manually operated switch 90. Thus, in the illustrated embodiment of the invention, a D.C. test supply is provided via the common pole 91 of the switch 90 having a plurality of contacts, a first contact 92 is connected directly to the flow related input line to the differential amplifier network. This permits insertion of a preset flow simulated signal. A second contact 93 provides a corresponding input to the servo input line to the operational amplifier 72 directly to simulate the output of the feedback potentiometer 17. The third contact 94 permits corresponding D.C. input to the input supply connection of the series parallel potentiometers 73 – 76 to energize amplifier 72 through the several calibration and adjustment potentiometers. A fourth contact 95 provides an input signal of the D.C. power supply connection. Fifth and sixth contacts 96 and 97 provide signals to the input and output sides of the detector transformer 58 of the flow related channel. A seventh contact 98 provides an input to the potentiometer 64.

In the operation of the illustrated embodiment of the circuit, the system is adjusted with a zero input signal to close the additive control valve 6 and position the servo potentiometer 17 at zero. The parts per million control potentiometer 64 is adjusted to introduce an additive in a desired proportion to a preselected flow rate. The energization of the feedback potentiometer 17 is adjusted through the calibration potentiometer 75, the span adjustment potentiometer 76 and the pressure preset potentiometer 74. Thus, the back pressure of the flow line is known and the voltage across the feedback potentiometer 17 is adjusted to vary the control signal in accordance with the pressure. This will provide for direct modification of the opening of the linear flow additive valve 6 to maintain precise amounts of additive flow through the flow line 3 for the known back pressure of the line 1. The calibration potentiometer 75 and the span potentiometer 76 provide the normal adjustment to the feedback potentiometer.

The linear additive valve 6 is then manually adjusted to establish the closure with the servo system at zero condition.

When the flow is initiated, the turbine meter 7 will establish a proportionate signal which is converted into an alternating current signal and then detected by the transformer-rectifier network 54 – 57. The D.C. analog signal is amplified and applied across the parts per million potentiometer 64. The voltage at the tap 65 is amplified by the amplifier 67 and applied to the summing point via resistor 70. This signal is compared and summated with the output of the feedback amplifier 72 to establish an error signal to the servo drive amplifier 69 corresponding to the algebraic sum appearing at the summing input point. The output is therefore either a positive or a negative voltage depending upon the relative amplitudes of the two input signals. If the output of the flow related signal is greater than that of the feedback signal, a positive signal is assumed to be established and operates the polarity sensitive relay 82 to close the forward contact 84 and correspondingly actuate the servomotor to drive the valve 6 in an opening direction. As the valve 6 opens, the tap 73 of the feedback potentiometer 17 is correspondingly changed to increase the input signal to the feedback amplifier 72 and thereby to the summing point until its signal balances the signal of the flow related signal input. At that point, the output of the servo amplifier 69 deenergizes the polarity sensitive relay 82 and the servomotor 16 stops and holds the linear valve 6 in the desired flow position. If the flow rate increases, thus indicating that more material must be added to maintain the desired proportionate rate of additive per unit of the main liquid, the input signal to the flow related amplifier 67 will increase, thereby correspondingly establishing a positive input signal to the polarity sensitive relay 82. The relay 82 will again close the forward contact 84 and provide power to drive the servomotor 16 to further open the valve 6.

If, for any reason, the main liquid flow rate decreases, the signal applied to potentiometer 64 decreases and the output of amplifier 67 correspondingly decreases. As a result, the output of the feedback amplifier 72 is relatively greater. The servo drive amplifier 69 will then establish a relatively negative potential signal and actuates the polarity sensitive relay 82 to drive the common pole 83 into engagement with the valve closing or reverse contact 85. This energizes the servomotor 16 in the opposite direction resulting in a corresponding closing of the valve 6 and a resetting of the feedback potentiometer 17. The valve 6 thus closes until the feedback potentiometer 17 provides a related signal directly balancing the flow related signal thereby resulting in a deenergization of the polarity sensitive relay 82 and holding of the linear additive valve 6 in the proper flow position.

If, for any reason, the main flow decreases to a preselected minimum, the output signal of the amplifier 22 drops below the holding level of the main cutoff valve 20. This, in turn, terminates the feeding of additive flow and may simultaneously operate an alarm or other indication means, not shown.

Applicants have found that the differential amplifying and summing circuit of this invention provides a rapid response and a reliable driving of the valve to an accurate, additive flow position where the proportion of the additive is a very small proportion of the total flow. Very small changes in the pulse rate from the turbine meter 7 is rapidly and accurately sensed by the amplifier 67 and 72 feeding the single summing point, with an automatic and direct corrective drive of the linear metering valve 6 to establish and maintain a continuous correction in the injection rate of the additive and one which will, therefor, closely maintain the desired rate of additive proportional to the variation in the flow rate of the main line. The servo circuit of the present invention thereby contributes to the provision of precise injection of the additive liquid within the main flow of a relatively rapidly flowing liquid with a precise additive amount in the range of parts per million on a continuous basis.

Various modes of carrying out the invention are contemplated as being within the scope of the following claims, particularly pointing out and distinctly claiming the subject matter which is regarded as the invention.

We claim:

1. A metering additive control circuit for supplying relatively minute quantities of a liquid to a flowing liquid, comprising a linear metering valve connected to supply said additive liquid to said flowing liquid in accordance with the opening of the valve, a reversible drive means connected to position said valve, a metering means establishing an electrical signal proportional to the per unit volumetric flow through the metering means, selection means connected to said metering means and establishing an additive rate signal proportional to a selected rate of adding said liquid, a differential summing amplifier including input means connected to said selection means, a feedback signal means coupled and positioned by said drive means, said feedback signal means being connected to said input means, a polarity sensitive switching means connected to the output of said summing amplifier and having first circuit means and second circuit means actuated in response to a corresponding first and second polarity output of said summing amplifier, said drive means being connected to said first and second circuit means to correspondingly position said metering valve.

2. The metering additive control circuit of claim 1 including a line pressure compensating potentiometer having a tap for establishing a signal related to the pressure in said flowing liquid, and means connecting the potentiometer to said input means.

3. The metering additive control circuit of claim 2 wherein said line pressure compensating potentiometer is connected in series with said feedback signal means.

4. The metering additive control circuit of claim 1 wherein said selection means is a potentiometer connected to said metering means and having a selection output tap, said feedback means is a potentiometer having a feedback output tap coupled to said drive means, a first amplifier connected to said selection output tap, a second amplifier connected to said feedback output tap, a first linear summing resistor connecting said first amplifier to the input means of said summing amplifier, and a second linear summing resistor connecting said second amplifier to the input means of the summing amplifier.

5. The metering additive control circuit of claim 4 having a flow pressure compensating potentiometer connected in series with said feedback potentiometer to compensate for the pressure of the flowing liquid.

6. The metering additive control circuit of claim 1 wherein said metering means includes a pulse signal means to establish a pulse train signal of corresponding amplitude pulses having a pulse rate proportional to the per unit volumetric flow through the meter, an amplifying means is connected to said signal means to convert said pulses to an alternating current signal proportional to said pulse rate, a rectifying means is connected to said amplifying means and establishes a corresponding direct current signal, and said selection means includes a potentiometer connected to said amplifying means having an output tap connected to said input means.

7. The metering additive control circuit of claim 6 wherein said feedback signal means includes a potentiometer having a feedback tap coupled to said drive means, said feedback tap being connected to said summing input means, said polarity sensitive switching means being a polarity sensitive relay means connected to said summing amplifier and having first contact means in said first circuit means and closed in response to a first polarity and having second contact means in said second circuit means and closed in response to a second polarity.

8. The metering additive control circuit of claim 1 wherein said meter includes a pulse signal means to establish a pulse train signal of corresponding amplitude pulses having a pulse rate proportional to the per unit volumetric flow through the meter, a converting and amplifying means connected to said meter and establishing an analog signal proportional to said pulse rate, said selection means including a potentiometer connected to said converting and amplifying means and having an output tap to select a proportionate part of said analog signal, said feedback signal means including a potentiometer having a feedback tap coupled to said servomotor, said feedback tap being connected to said summing input means, said polarity sensitive switching means including a polarity sensitive relay means connected to said summing amplifier and having first contact means closed in response to a first polarity and second contact means closed in response to a second polarity, said drive means being a reversible servomotor having a forward drive circuit connected to said first contact means and a reverse drive circuit connected to said second contact means.

9. In a metering additive control circuit for supplying relatively minute quantities of a fluid material to a flowing liquid within a main flow line by selectively positioning a valve opening in an additive supply in accordance with a flow related signal and a valve position feedback signal, the improvement in a comparison and drive valve circuit comprising a reversible servo-positioning drive motor coupled to said valve, a pulse signal means to establish a pulse train signal of corresponding amplitude pulses having a pulse rate proportional to the per unit volumetric flow through the flow line, a converting means connected to said meter and establishing an analog signal proportional to said pulse rate, a potentiometer connected to said converting means and having an output tap to select a proportionate part of said analog signal, a summing amplifier including a summing input means connected to said potentiometer tap, a feedback signal potentiometer having a feedback tap coupled to said servomotor, said feedback tap being connected to said summing input means, a polarity sensitive means connected to said summing amplifier and having first means responsive to a first polarity drive signal to energize the servomotor in a first direction and second means responsive to a second polarity drive signal to energize said servomotor in a second direction.

* * * * *